(No Model.)
J. H. SNYDER.
HORSE COLLAR.
No. 274,229. Patented Mar. 20, 1883.
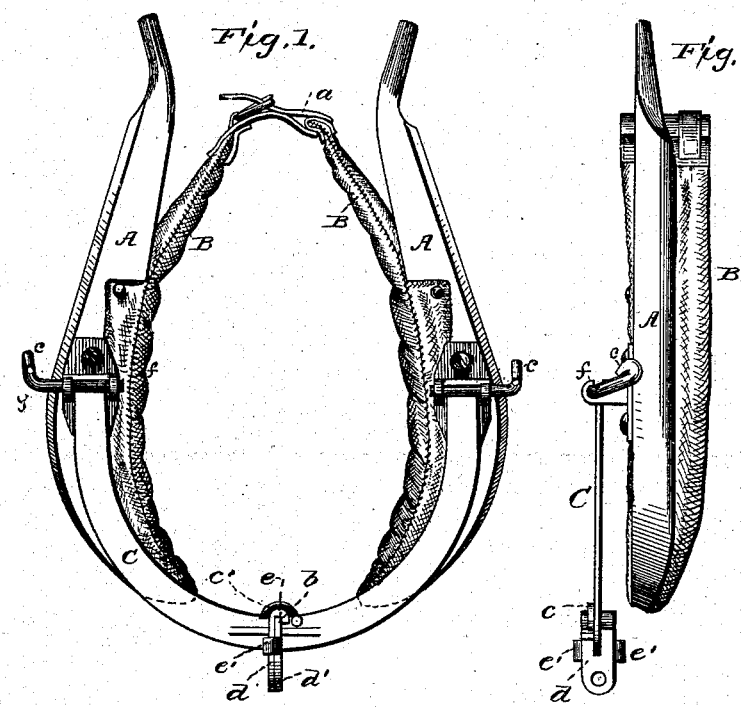
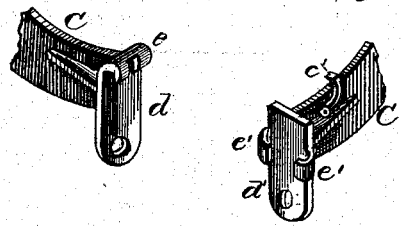
WITNESSES:
INVENTOR.

UNITED STATES PATENT OFFICE.

JOHN H. SNYDER, OF FRUITPORT, MICHIGAN.

HORSE-COLLAR.

SPECIFICATION forming part of Letters Patent No. 274,229, dated March 20, 1883.

Application filed December 7, 1882. (No model.)

*To all whom it may concern:*

Be it known that I, JOHN H. SNYDER, a citizen of the United States, residing at Fruitport, in the county of Muskegon and State of Michigan, have invented certain new and useful Improvements in Horse-Collars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in horse-collars of that class in which the hame and collar are united, so as to allow independent movement of the hames and to save time in adjusting them to the horse's neck in harnessing, and is an improvement on the collar for which Letters Patent were granted to me on the 2d day of December, 1879, being No. 222,323, said improvement consisting, essentially, in providing the curved bar which unites the two halves of the collar with a joint of peculiar construction, which may be readily opened to place the collar over the horse's neck, and the parts then firmly united, so as to hold the two halves in their proper position with relation to each other.

In the accompanying drawings, to which reference is made in the description following, Figure 1 is a front view of the collar with the two halves united. Fig. 2 is a side view of the same. Figs. 3 and 4 are detail views of the joint which connects the two parts of the curved bar.

This collar is formed by uniting three principal elements—namely, the hames A, which may be of either wood or metal, and have substantially the same general form as those in common use. They are not, however, united directly by straps or other devices at either top or bottom, but are indirectly connected at the top by means of the pads B, which are secured to the hames through the lower portion of their length, the upper ends of said pads being connected by the strap *a* or any other suitable device. This method of connecting the pads to the hames allows the upper part of the pads to readily conform to the shape of the horse's neck, while the strap allows them to be fitted to animals having large or small necks, the upper part of the hames being allowed perfect freedom to expand or contract to suit the pad.

To hold the lower ends of the pads and hames in their proper relative positions, a strong curved bar, C, is employed. This bar is connected to each hame by a hinge, *f*. These hinges are formed by connecting the ends of the curved bar to ears attached to the hames by means of pintles *g*, which may have one end bent, as shown at *c*, to form the trace-hooks. This curved bar C is divided at or near the middle of its length, each part being provided with a joint-plate, (designated by the letters *d* and *d'*,) the part *d* having its upper end curved or bent over to form a hook, *e*, which receives the upper end of the plate *d'*, attached to the other portion of the bar when the parts are united. This plate *d'* is also provided with the hooks *e' e'* upon each side, which grasp and hold firmly the sides of the plate *d* when the two are connected. A curved hook, *c'*, is attached to the bar back of the plate *d'*, which may be turned down over the hook *e* upon the opposite plate, thus firmly locking the two parts of the bar C together, causing it to be perfectly rigid, and in effect the same as the solid curved bar used for connecting the two hames in the patent above referred to, but having the advantage over that shown and described in said patent, in that it may be readily disjointed when desired, so as to allow its speedy adjustment upon the animal's neck. The lower ends of the plates *d* and *d'* are each pierced with a hole, by means of which a neck-yoke may be attached, or through which any suitable fastening device may be put, if found advisable. This bar C is curved to such an extent as to pass from side to side of the animal's neck without touching, thus allowing the lower ends of the hames and pads to be widely separated, preventing all pressure upon the windpipe of the animal, and allowing each side of the collar to rock freely upon the shoulder-blade in conformity with the alternate movement of the same caused by the operation of the animal's legs in moving forward.

Having thus described my invention, I claim as new, and desire to secure by Letters Patent, the following:

1. In a horse-collar, the combination of two hames and pads united to the same through only a portion of their length, leaving the upper ends of the hames free, with a jointed curved bar connecting the same by hinged connections at the lower ends, substantially as and for the purpose specified.

2. In a horse-collar, the curved bar C, formed in two parts, the parts being provided, respectively, with the plates $d$ and $d'$ and the hook $c'$, all arranged for joint operation in the manner shown and described.

In testimony whereof I affix my signature in presence of two witnesses.

JOHN H. SNYDER.

Witnesses:
C. C. CHAMBERLAIN,
S. E. HARDING.